United States Patent
Raynes et al.

[15] 3,666,118
[45] May 30, 1972

[54] SYSTEM FOR POSITIONING A WHEELED CARRIER

[72] Inventors: Burt F. Raynes, Chula Vista; Necati Kanatsiz, Spring Valley; Robert E. Ottle, San Diego, all of Calif.

[73] Assignee: Rohr Corporation, Chula Vista, San Diego, Calif.

[22] Filed: July 27, 1970

[21] Appl. No.: 58,351

[52] U.S. Cl.................................................................214/38 B
[51] Int. Cl........................................................B65g 69/24
[58] Field of Search..............214/38 B, 38 BA, 38 BB; 238/4

[56] References Cited

UNITED STATES PATENTS

| | | |
|---|---|---|
| 1,132,960 | 3/1915 | Moreland............................214/38 B |
| 2,634,988 | 4/1953 | Porte....................................214/38 B |
| 2,828,027 | 3/1958 | Stevenson et al.................214/38 B X |

*Primary Examiner*—Robert G. Sheridan
*Attorney*—George E. Pearson

[57] ABSTRACT

A carrier having wheels at the rear thereof is moved to a selected location on a surface by means of a system which includes a centering deck supported on said surface for movement in any direction thereon and a notched centering member fixedly positioned on one side of said centering deck. The centering member is spaced above the aforesaid surface, and a pin depending from the rear of the carrier engages one wall of the notch in the centering member as the wheels of the carrier roll across the centering deck toward the centering member. Springs are arranged to resiliently bias the centering deck into a desired alignment relative to the centering member, and ramps are fixedly positioned on opposite sides of the latter to lift the rear of the carrier as it rolls across the centering deck. Centering plates are located on the aforesaid surface at a predetermined distance from the centering deck and supports are mounted on the forward end of the carrier, the lower ends of said supports moving to the centers of the centering plates when supported on the sloped upper surfaces of the latter.

6 Claims, 5 Drawing Figures

INVENTOR.
BURT F. RAYNES
NECATI KANATSIZ
ROBERT E. OTTLE
Edwin D. Grant
ATTORNEY

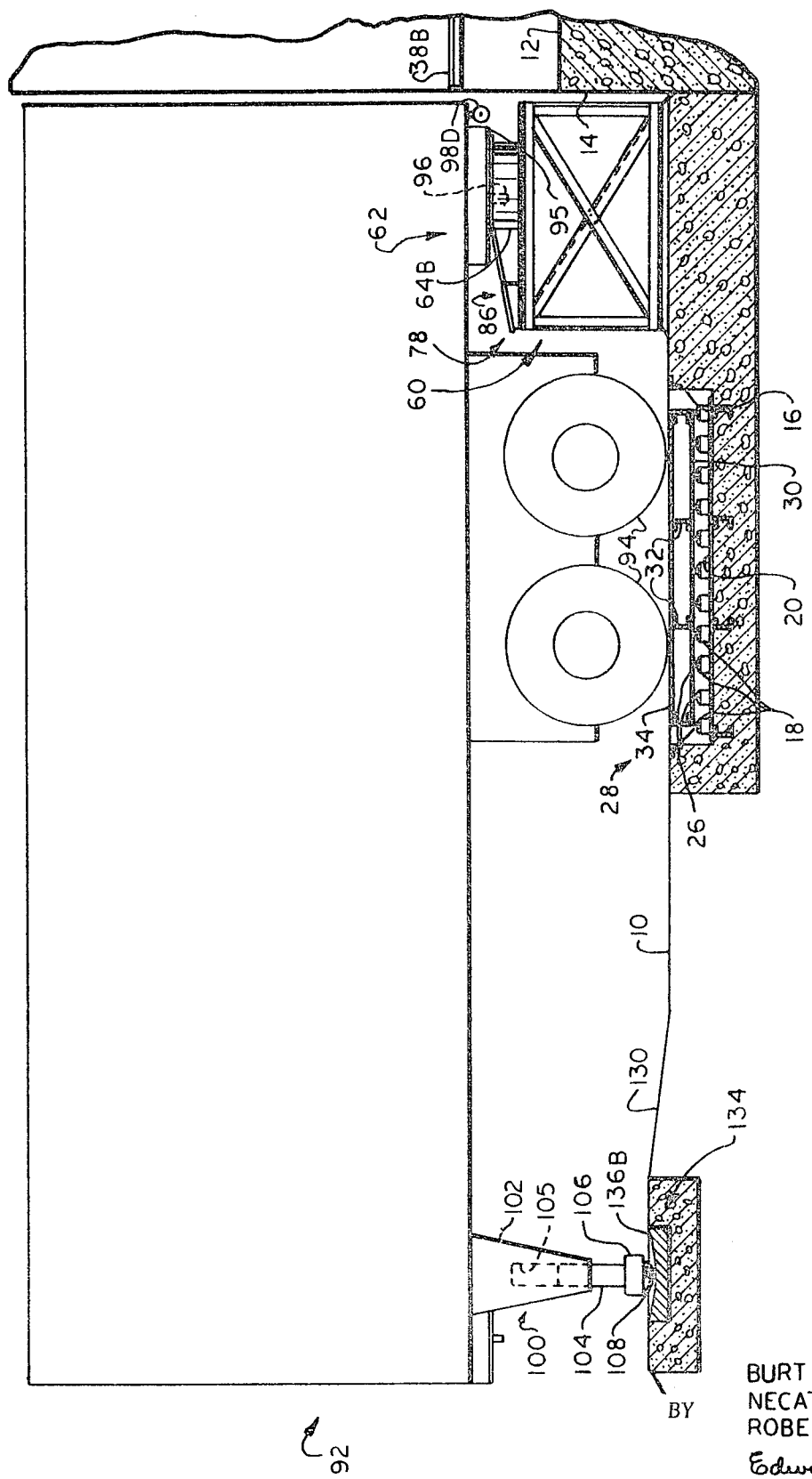

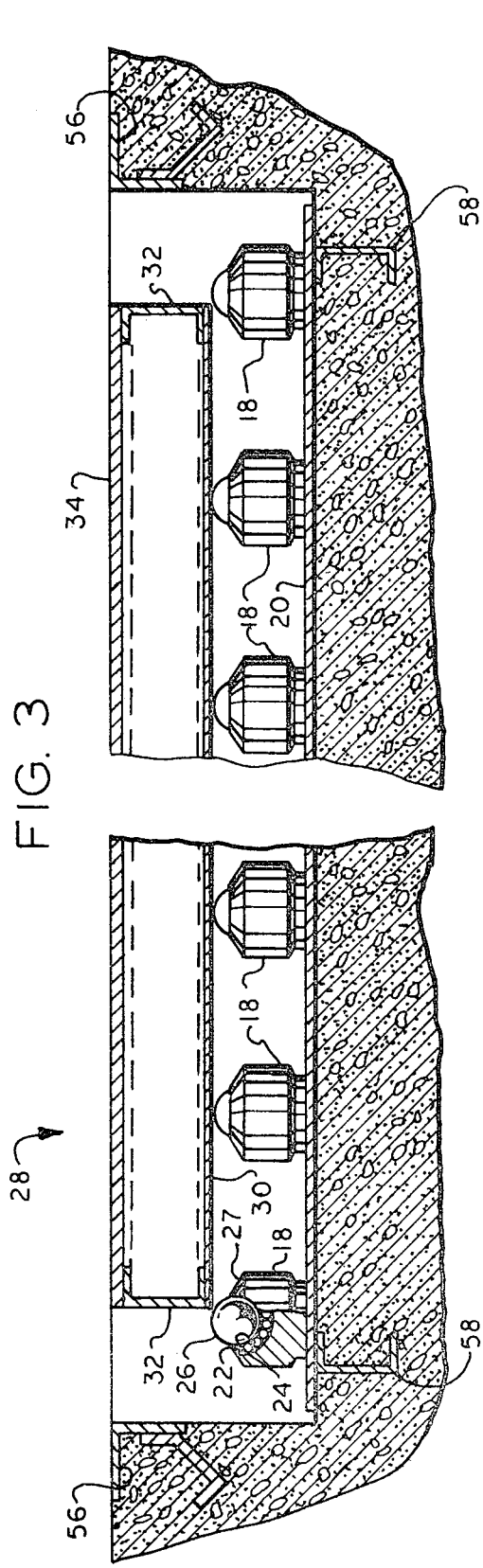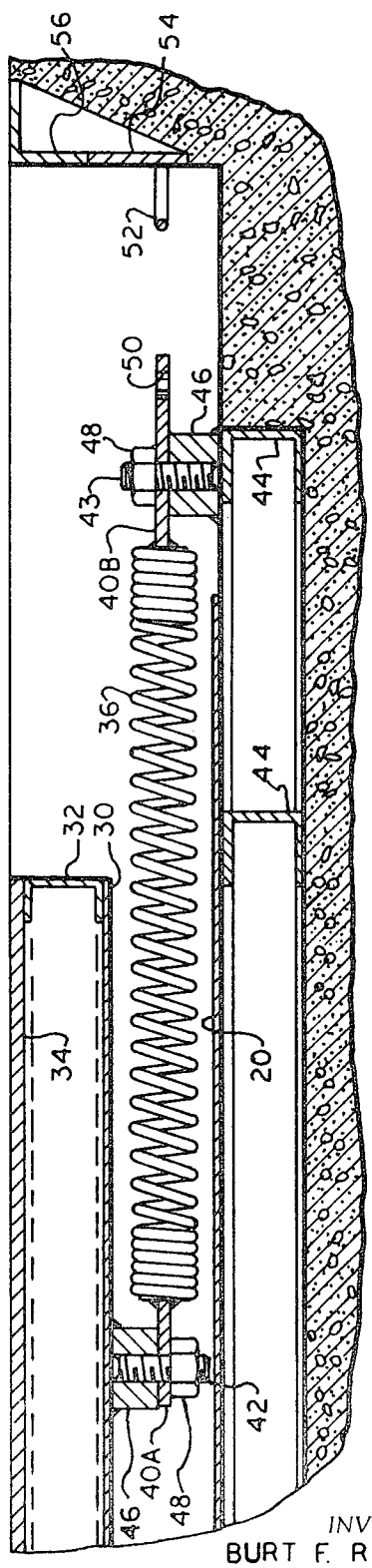

3,666,118

SYSTEM FOR POSITIONING A WHEELED CARRIER

BACKGROUND OF THE INVENTION

This invention relates to positioning equipment and, more particularly, to a system for moving a rear-wheeled carrier, such as a trailer of the type employed in transporting cargo on highways, into a desired position on a surface.

At many warehouses, post offices and other distribution centers where packages and the like are shipped and received, trailers must be parked closely together in side-by-side relation adjacent a platform. Heretofore considerable time has been lost in maneuvering such carriers into proper position, particularly where they must be precisely aligned with rollers, belts or other conveying equipment mounted in fixed position on a platform. It is also frequently inconvenient to move carts, fork lifts and similar equipment on and off trailers the beds of which are positioned at different heights relative to the surface of a platform. The invention disclosed herein provides effective means for precisely positioning a trailer in a predetermined alignment relative to the edge and the surface of a platform (or, more generally, relative to any kind of station fixed in position relative to a surface on which the trailer is supported). This advantageous function of apparatus in accordance with the invention is achieved without the use of special power equipment, thus making such apparatus economical to install, use and maintain.

SUMMARY OF THE INVENTION

As described in detail hereinafter, a positioning system in accordance with the present invention comprises a rigid platform, or centering deck, that is supported adjacent a surface for movement in any direction parallel thereto. After the wheels of a trailer are rolled onto the centering deck, it cooperates with a tubular centering member to shift the end of the trailer longitudinally of the edge of a platform (or, more generally, longitudinally of a line on the surface on which the trailer is supported) and into register with a loading or unloading station. The centering deck is situated in a shallow pit formed in the surface on which the wheels of the trailer are supported before they are rolled onto the centering deck (said surface being hereinafter referred to as the apron), and the centering member is fixedly positioned adjacent this pit. Preferably a plurality of balls are rotatably mounted on the floor of the pit, and the centering deck rests upon these balls with its upper surface even with the apron. To bias the centering deck into a predetermined alignment with respect to the centering member, springs are attached to the corners of the centering deck and to the floor of the pit. The centering member is positioned above the apron in substantially parallel relation therewith and has a notch formed in the edge thereof which faces the centering deck. A trailer which is to be positioned by means of the above described components has a pin fixedly mounted on the rear thereof, said pin being located at the middle of the bed of the trailer and depending from the lower side thereof so that it can engage a wall of the notch in the centering member as the wheels of the trailer roll across the centering deck toward said centering member. Thus the sliding motion of the pin along a wall of the fixedly positioned centering member serves to shift the end of the trailer relative to said centering member and align it with the aforesaid station, which movement is readily effected since the wheels of the trailer are supported on the centering deck and the latter is supported with low friction on the balls on the floor of the pit (the aforesaid springs bias the centering deck into a predetermined alignment with respect to the centering member but do not prevent movement of the centering deck as the end of the trailer is shifted). Rotatably mounted on the trailer at the rear edge thereof are four rollers. As the wheels of the trailer roll across the centering deck as aforesaid, these rollers respectively engage four ramps which are fixedly positioned adjacent the centering member, thus lifting the rear of the trailer. A positioning system in accordance with the invention also preferably comprises means for aligning the forward end of a trailer relative to the centering member, which means comprise a pair of elongate supports which depend from the forward end of said trailer and engage concave surfaces of a pair of centering plates fixedly positioned on the apron at a predetermined distance from the centering member.

OBJECTS OF THE INVENTION

It is a broad object of this invention to provide effective means for moving a trailer or similar carrier to a predetermined location on a surface, without the use of power equipment other than a tractor attached to the trailer.

Another object of the invention is to provide a system which can be economically employed to position the bed of a trailer a selected distance above a surface and to align its longitudinal axis relative to a fixed point.

An additional object of the invention is to provide a system by means of which the longitudinal axis of the bed of a trailer can be aligned in perpendicular relation to the edge of a platform at a predetermined point thereon and can be further aligned in parallel relation to a surface at a predetermined distance therefrom.

DESCRIPTION OF THE DRAWINGS

FIG. 2 is a partially sectional side elevation of the same components and trailer, taken along the plane represented by line 2—2 in FIG. 1 and in the direction indicated therein;

FIG. 3 is a sectional, detailed elevational view of a centering deck and other components illustrated in FIGS. 1 and 2, taken along the plane represented by line 3–3 in FIG. 1 and in the direction indicated therein, FIG. 4 is a sectional, detailed elevational view of one of four springs illustrated in FIG. 1, taken along the plane represented by line 4–4 in that drawing and in the direction indicated therein.

Throughout the drawings and the following specification, the same parts are designated by the same numbers.

DETAILED DESCRIPTION

Figure 1:
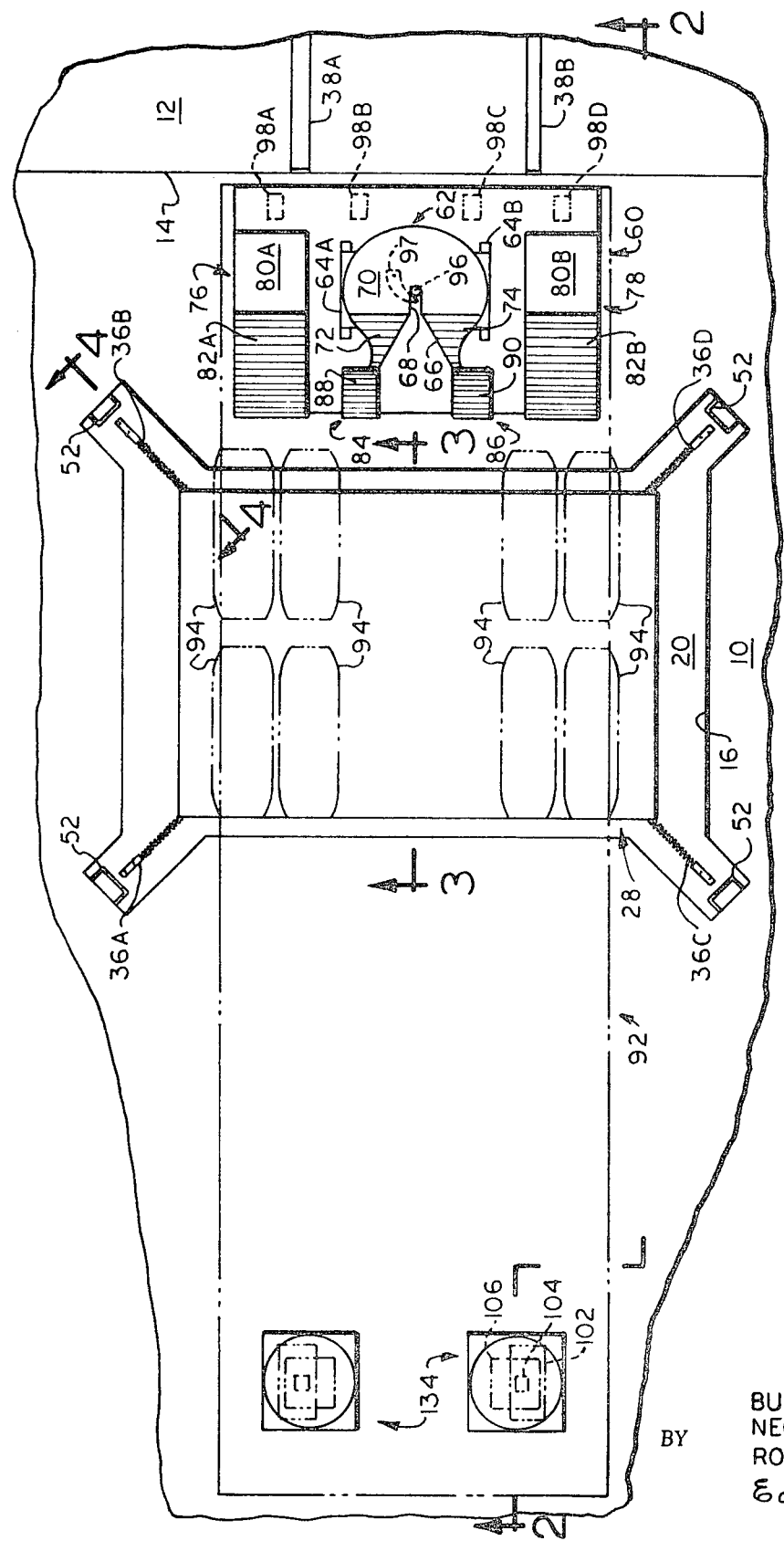
FIG. 1 is a plan view of components of a preferred embodiment of the invention, the drawing outlining the sides and wheels of a trailer on which some of said components are mounted.

As illustrated in FIGS. 1 and 2, a preferred embodiment of this invention comprises an apron 10 that extends horizontally from an elevated loading platform 12 having a linear edge 14. A flat-bottomed pit 16 is formed in apron 10 adjacent platform 12, two sides of this pit being parallel to edge 14. At each corner of pit 16 is a diagonally disposed recess. As best illustrated in FIG. 3, a plurality of housings 18 are fixedly secured to a plate 20 which in turn is fastened to the floor of pit 16, said housings being spaced apart and each having in the upper portion thereof a hemispherical cavity 22 in which a plurality of small balls 24 are disposed. A large ball 26 is rotatably supported on the balls 24 in each housing 18 and projects above a retaining ring 27 secured to the upper surface of the housing. Disposed in pit 16 is a rigid platform, or centering deck, which is generally designated by the number 28 and which comprises a bottom plate 30 supported on balls 26, a rectangular frame formed of a plurality of channels 32, and a top plate 34 the upper surface of which is even with the upper edge of pit 16. Plates 30, 34 and channels 32 are fixedly secured to one another by suitable means, such as welding.

As illustrated in FIG. 1, the sides and ends of centering deck 28 are spaced from the walls of pit 16. More specifically, four helical springs 36A – 36D are attached to the centering deck and to the floor of pit 16 to thereby resiliently bias the centering deck into a position wherein its sides are parallel to the edge 14 of platform 12 and spaced a selected distance therefrom, and its ends are equidistant from a plane which is perpendicular to apron 10 and also perpendicular to said edge 14 and which is centered at a loading or unloading station on said platform. For example, in the case of the preferred embodiment of the invention the aforesaid plane is centered between a pair of rails 38A, 38B mounted on platform 12 on perpendicular relation to the edge 14 thereof. As illustrated in FIG. 4, tabs 40A, 40B are respectively attached to the ends of each spring 30A – 30D, tab 40A being pivotally connected to a stud 42 which is welded to the bottom plate 30 of centering deck 28 and tab 40B being pivotally connected to a stud 43 which is welded to a channel 44 fixedly embedded in the floor of pit 16. An annular spacer 46 is positioned on each stud 42, 43, and a nut 48 is engaged with the free end of each stud to retain the tab 40 thereon. To facilitate the tensioning of springs 36 by suitable means before they are attached to studs 43, the tab 40B on each spring has a hole 50 formed therein, and a U-shaped anchor 52 is fixedly secured to a steel plate 54 mounted on the wall of pit 16 at the end of each of the recesses formed therein. An angle 56 is placed at the upper portion of the other walls of pit 16 to form the upper edge thereof, and a plurality of beams 58 are disposed under plate 20 to provide support therefor. (See FIG. 3).

Illustrated in side elevation in FIG. 2 is a base, generally designated by the number 60, which is fixedly positioned on apron 10 adjacent the edge of platform 12 and which is formed of conventional structural members. As can best be seen in FIG. 1, a tabular centering member, generally designated by the number 62, is mounted on the upper end of base 60, this centering member being a so-called "fifth wheel" of the type placed on the rear of a motor vehicle to attach a trailer thereto. However, although a conventional 5th wheel is generally pivotally mounted on a vehicle, centering member 62 is mounted in fixed position on base 60. More particularly, centering member 62 is bolted to two supports 64A, 64B that are welded to the upper surface of base 60. The edge of centering member 62 facing centering deck 28 has a notch 66 formed therein, and a slot 68 extends from the apex of this notch toward platform 12. The side walls of slot 68 are disposed perpendicular to the edge of the platform, and a plane disposed perpendicular to the latter and equidistant from rails 38A, 38B is also equidistant from the side walls of said slot and the walls of notch 66. The portion 70 of the upper surface of centering member 62 disposed adjacent slot 68 is parallel to platform 12 and spaced a predetermined distance thereabove, and portions 72, 74 of said upper surface extending laterally from notch 66 between the apex and base thereof are inclined downward in the direction of centering deck 28. A pair of side ramps, respectively generally designated by the numbers 76, 78, are fixedly mounted on the upper surface of base 60 on opposite sides of centering member 62, said side ramps being coterminous (i.e., their ends are equidistant from the edge of platform 12 and centering deck 28) and their longitudinal axes being disposed perpendicular to the edge of said platform. The portion 80A, 80B of the upper surface of each side ramp disposed adjacent platform 12 is coplanar with said parallel portion 70 of the upper surface of centering member 62, and the portion 82A, 82B of the upper surface of each side ramp remote from said platform is coplanar with the inclined portions 72, 74 of the upper surface of said centering member. A pair of middle ramps, respectively generally designated by the numbers 84, 86, are also fixedly mounted on the upper surface of base 60 in spaced parallel relation to side ramps 76, 78 and to each other. More particularly, one end of each middle ramp is coterminous with the ends of side ramps 76, 78 which face centering deck 28, and the other end thereof abuts centering member 62 on a respective side of notch 66. The upper surfaces 88, 90 of middle ramps 84, 86 are coplanar with the inclined portions 72, 74, 82A, 82B of the upper surfaces of centering member 62 and side ramps 76, 78.

Figure 5:
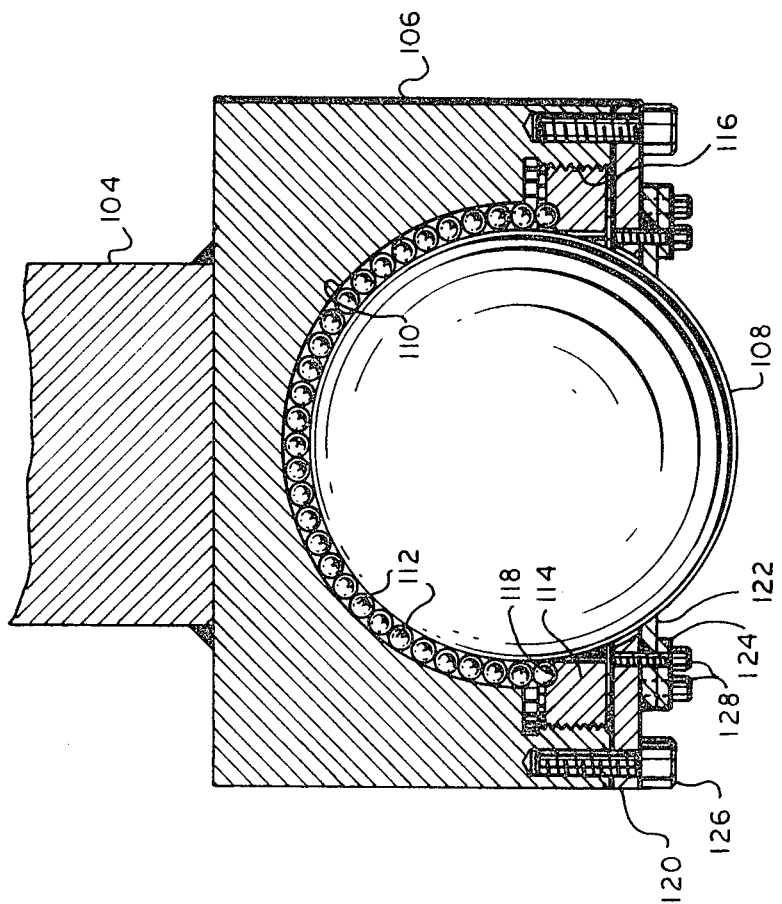
FIG. 5 is a sectional view taken along the longitudinal axis of one of two identical ball casters which are mounted at the forward end of the trailer illustrated in FIGS. 1 and 2.

In FIGS. 1 and 2 the number 92 generally designates a trailer having eight wheels 94 at the rear thereof. In accordance with this invention, trailer 92 is provided with special components including a support plate 95 (See FIG. 2) fixedly mounted on the lower side of the trailer in parallel relation thereto. Support plate 95 is disposed adjacent the rear edge of trailer 92 intermediate the ends thereof, and a pin 96 (represented by broken lines in both FIGS. 1 and 2) is fixedly connected to said support plate and depends perpendicularly therefrom. The diameter of pin 96 is slightly less than the width of slot 68, and centering member 62 is provided with a latch 97 (See FIG. 1) to releasably lock said pin within said slot. Also mounted on trailer 92 are four rollers 98A – 98D, these rollers being disposed in spaced, coaxial relation along the rear edge of said trailer and the lowermost points thereof being slightly lower than the lower surface of support plate 95. Furthermore, trailer 92 is provided with a pair of support legs (only one of which is fully illustrated, in FIG. 2, and which is generally designated in the latter drawing by the number 100). The two support legs 100 are mounted on the forward end of trailer 92 and depend therefrom. More specifically, each support leg 100 comprises an elongate support member 102 (both of these members being illustrated by broken lines in FIG. 1) which is fixedly connected at its upper end to the lower side of trailer 92 and disposed perpendicular thereto, an extensible member 104 the upper portion of which is slidably engaged within a vertically disposed slot 105 in said support member, a housing 106 mounted on the lower end of said extensible member, and a ball 108 rotatably mounted in said housing and a portion of which projects from the lower end thereof. Means (not shown) operatively associated with members 102 and members 104 are adapted to extend and retract the latter with respect to the former. In the preferred embodiment of the invention, said members 102 and 104 and the extension and retraction means associated therewith are products sold by Utility Trailer Manufacturing Company, Los Angeles, California. However, other conventional support legs for trailers may be substituted for these components of the preferred embodiment. Members 102 are equidistant from the longitudinal axis of trailer 92 and centered on a line disposed perpendicular thereto. It will be seen in FIG. 5 that each housing 106 has formed therein a hemispherical cavity 110 which is open downward. A plurality of small balls 112 are disposed between the wall of cavity 110 and ball 108. The periphery of a ring 114 is threadedly engaged with the wall of a counterbore 116 extending from cavity 110 to the lower surface of housing 106, this ring having at its upper, inner edge a raceway 118 in which some of the balls 112 are disposed. Ball 108 is held within cavity 110 by means of a retaining assembly comprising three rings 120, 122, 124 connected to housing 106 and to one another by machine screws 126, 128 respectively.

Apron 10 has a pair of elevated areas 130 thereon (one of which is illustrated in side elevation in FIG. 2), these areas being spaced equidistant from centering member 62. A pair of centering plates, generally designated by the numbers 132, 134 in FIG. 1, are centrally disposed in these elevated areas with their respective edges even with the surfaces thereof. More specifically, each centering plate 132, 134 is disposed parallel to loading apron 10 and has a conical dimple 136A, 136B formed in its upper surface, the center-to-center spacing of the two dimples being equal to the distance between the longitudinal axes of the two support legs 100 and the centers of said dimples being equidistant from centering member 62 (i.e., spaced equidistant from a plane which is disposed perpendicular to apron 10 and which is coincident with the longitudinal axis of slot 68, and centered on a line disposed perpendicular to said plane and spaced a predetermined distance from said centering member).

OPERATION

When a trailer 92 is to be positioned by means of the above-described apparatus, members 104 of support legs 100 are first locked in an extended position wherein the balls 108 mounted thereon are supported on apron 10. The driver of the tractor to which trailer 92 is attached then moves the wheels 94 of the trailer onto centering deck 28, care being taken to align the trailer so that pin 96 will engage a side wall of the notch 66 in centering member 62 and balls 108 will respectively engage the surfaces of the dimples 136A, 136B in centering plates 132, 134 when said pin is locked at the end of slot 68 of centering member 62 as described hereinafter. Thus a driver must maneuver the trailer only with such accuracy as is necessary to position the rear of the trailer within a zone as wide as the base of notch 66 and to position the forward end of the trailer within a zone as wide as one of said dimples 136A, 136B, which accuracy is readily attained by a skillful driver. After pin 96 contacts a side wall of notch 66 and slides therealong, the rear of trailer 92 is shifted longitudinally of the edge 14 of platform 12 as wheels 94 roll across centering deck 28 toward centering member 62, said centering deck also simultaneously shifting longitudinally of said edge 14. It should be noted that centering deck 28 remains at substantially the same distance from centering member 62 when it is shifted longitudinally of edge 14 as aforesaid, since springs 36A – 36D bias the centering deck into the position thereof illustrated in FIGS. 1 and 2 and since wheels 94 do not exert any appreciable force on the centering deck in a direction which would tend to move the latter toward or away from said centering member. As trailer 92 moves toward platform 12 rollers 98A – 98D respectively engage surfaces 82A, 82B, 88, 90 of side ramps 76, 78 and middle ramps 84, 86, and the rear of said trailer is thus lifted away from apron 10 and the weight of the trailer and its cargo is removed from springs (not shown) to which wheels 94 are attached. Movement of trailer 92 toward platform 12 brings rollers 98B and 98C respectively into engagement with surfaces 72, 74 of centering member 62, and thereafter further movement of said trailer brings rollers 98A – 98D respectively into engagement with surfaces 80A, 80B, 70 of side ramps 76, 78 and said centering member. Before pin 96 reaches the end of slot 68 the rollers 98A – 98D roll off the end of side ramps 76, 78 and centering member 62, and the lower surface of support plate 95 then engages surface 70 of centering member 62. When pin 96 reaches the end of slot 68 the mechanism associated with latch 97 causes the latter to pivot to the position thereof illustrated in FIG. 1, thereby holding the rear of trailer 92 in fixed position at a predetermined distance from the edge of platform 12. Obviously, the arrangement of centering member 62 and support plate 95 is such that the bed of trailer 92 is also positively positioned at a fixed distance above apron 10 and platform 12.

As noted hereinbefore, trailer 92 must be maneuvered into a position wherein balls 108 are respectively supported on the surfaces of the dimples 136A, 136B in centering plates 132, 134 when pin 96 is locked in slot 68. After this necessary condition is attained, trailer 92 is disconnected from the tractor which has moved it into position on apron 10, whereupon balls 108 roll to the centers of said dimples 136A, 136B. Thus the forward end of trailer 92 is placed in the required alignment with the edge 14 of platform 12. Moreover, because centering plates 132, 134 are disposed at a predetermined distance above apron 10, the forward end of the bed of the trailer is raised to a position level with the rear end thereof when balls 108 are centered on said plates.

When trailer 92 has been loaded or unloaded, latch 97 is pivoted to remove the end thereof from the slot 68 in centering member 62, after which the trailer can be pulled away from platform 12. Members 104 are of course retracted relative to support members 102 while trailer 92 is in use on a highway.

Although this invention has been described with reference to a particular embodiment of the same, it should not be considered to be limited thereto for various modifications could be made therein by one having ordinary skill in the art without departing from the spirit and scope of the invention as defined in the following claims.

What is claimed as new and useful and desired to be secured by Letters Patent is:

1. A system for moving a rear-wheeled carrier to a predetermined position on an apron, comprising a pin fixedly mounted on the rear of said carrier and depending from the lower side thereof, a centering deck supported adjacent said apron for movement in any direction parallel thereto and the upper surface of which is substantially coplanar with said apron, four helical springs each connected at one end to a point fixed relative to said apron and at the other end to said centering deck adjacent a respective one of the corners thereof so as to resiliently bias said centering deck into a predetermined alignment relative to said predetermined position, a centering member fixedly positioned on one side of said centering deck and at least a portion of the upper surface of which is disposed substantially parallel to said apron, the edge of said centering member facing said centering deck having a notch formed therein, said centering member being spaced above said apron so that said pin engages a side wall of said notch as the rear wheels of said carrier roll across said centering deck toward said centering member, thereby moving the rear of said carrier to said predetermined position, and a pair of support legs mounted on the forward end of said carrier and depending from the lower side thereof, and a pair of centering plates fixedly spaced apart on said apron on the side of said centering deck remote from said centering member and disposed substantially parallel to said apron, each centering plate having a dimple on the upper side thereof, the center-to-center spacing of the dimples on said centering plates being substantially equal to that of the lower ends of said support legs and said dimples being equidistant from said centering member.

2. The system defined in claim 1 wherein each of said support legs comprises an elongate support member fixedly attached to the lower side of said carrier and depending therefrom, an elongate, extensible member slidably mounted on said support member for movement along its own vertically disposed longitudinal axis, and a ball rotatably mounted on the lower end of said extensible member, said extensible member being fixable in either retracted or extended positions relative to said support member wherein said ball is respectively spaced from, or in contact with, said apron.

3. A system for moving a rear-wheeled trailer to a predetermined position relative to the edge and surface of a platform, comprising an apron disposed below said platform and having formed therein a pit the side edges of which are substantially parallel to the edge of said platform, a plurality of balls rotatably mounted on the floor of said pit and spaced apart thereon, a centering deck the lower surface of which rests on said balls and the upper surface of which is substantially coplanar with said apron, the sides of said centering deck being spaced from the sides of said pit, four helical springs respectively disposed diagonal to the corners of said centering deck and each connected at one end to a surface of said pit and at the other end to the corners of said centering deck, a support plate fixedly mounted on the lower side of said trailer in parallel relation thereto and disposed adjacent the rear edge of said trailer intermediate the ends thereof, a pin fixedly connected to said support plate and depending therefrom, a plurality of rollers mounted in spaced, substantially coaxial relation along the rear edge of said trailer, the lowermost points of said rollers being slightly lower than the lower surface of said support plate, a base fixedly disposed between said platform and said centering deck and positioned intermediate the ends of the latter, a centering member fixedly mounted on the upper end of said base, the edge of said centering member facing said centering deck having a notch formed therein, a slot extending from the apex of said notch toward said platform, the side walls of said slot being disposed substantially perpendicular to the edge of said platform, the portion of the upper surface of said centering member adjacent said alot being substantially parallel to the surface of said platform and portions of said upper surface extending laterally from said notch between the apex and base thereof being inclined downward in the direction of said centering deck, a pair of side ramps fixedly mounted on the upper end of said base on opposite sides of said centering member, said side ramps being substantially coterminous and their longitudinal axes being disposed substantially perpendicular to the edge of said platform, the portion of the upper surface of each of said side ramps disposed adjacent said platform being substantially coplanar with said parallel portion of the upper surface of said centering member and the portion of the upper surface of each of said side ramps remote from said platform being substantially coplanar with said inclined portions of the upper surface of said centering member, said centering member being spaced above said apron so that said pin engages a side wall of said notch as the rear wheels of said trailer roll across said centering deck toward said centering member, a pair of said rollers respectively contacting said inclined portions of the upper surface of said centering member and another pair of said rollers respectively contacting said inclined portions of said side ramps as said rear wheels roll as aforesaid.

4. The system defined in claim 3 including a pair of elongate support members fixedly mounted on the forward end of said trailer and depending from the lower side thereof, said support members being equidistant from the longitudinal axis of said trailer and centered on a line disposed perpendicular thereto, an elongate, extensible member slidably mounted on each of said support members for movement along its own vertically disposed longitudinal axis, and a ball rotatably mounted on the lower end of each of said extensible members, said extensible members being fixable in either retracted or extended positions relative to said support members wherein said balls thereon are respectively spaced from, or in contact with, said apron, and a pair of centering plates fixedly spaced apart on said apron on the side of said centering deck remote from said centering member and disposed substantially parallel to said apron, each centering plate having a dimple on the upper side thereof, the center-to-center spacing of the dimples on said centering plates being substantially equal to that of said balls on said extensible members and said dimples being equidistant from said centering member.

5. Apparatus as defined in claim 3 including a pair of middle ramps fixedly mounted on the upper end of said base in spaced parallel relation to said side ramps and to each other, one end of each of said middle ramps being substantially coterminous with the ends of said side ramps facing said centering deck and the other end thereof being disposed adjacent said centering member on a respective side of said notch therein, the upper surface of each of said middle ramps being substantially coplanar with said inclined portions of the upper surfaces of said centering member and said side ramps.

6. Apparatus as defined in claim 3 including means for releasably locking said pin in said slot in said centering member.

* * * * *